Patented Aug. 27, 1940

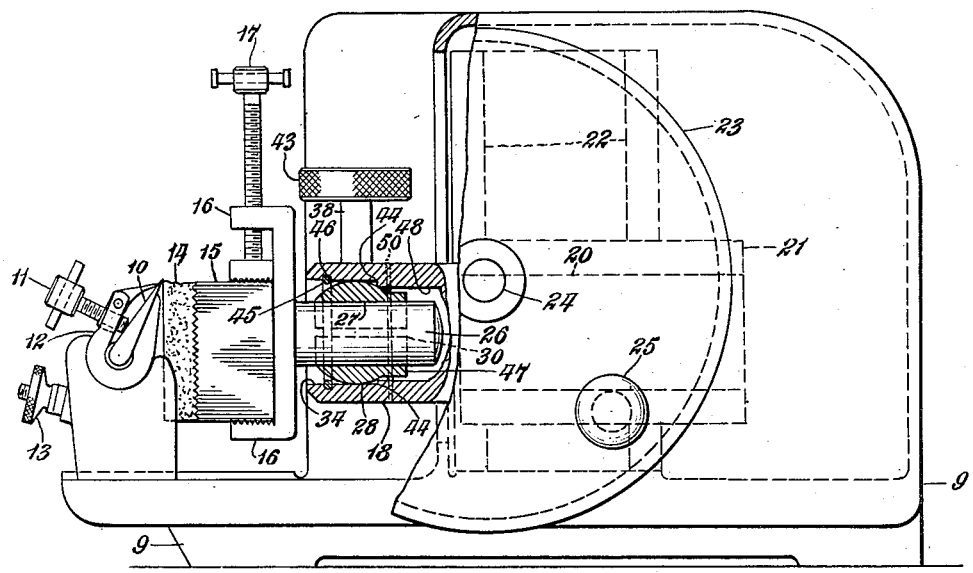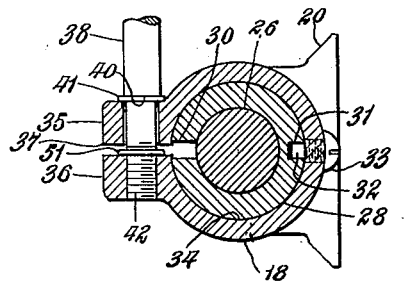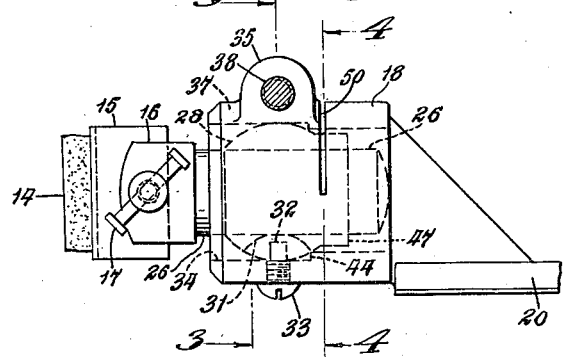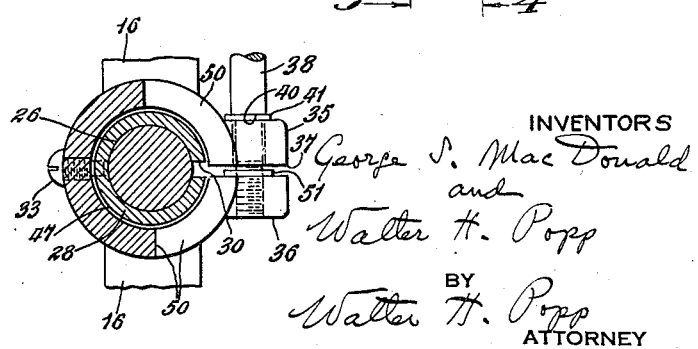

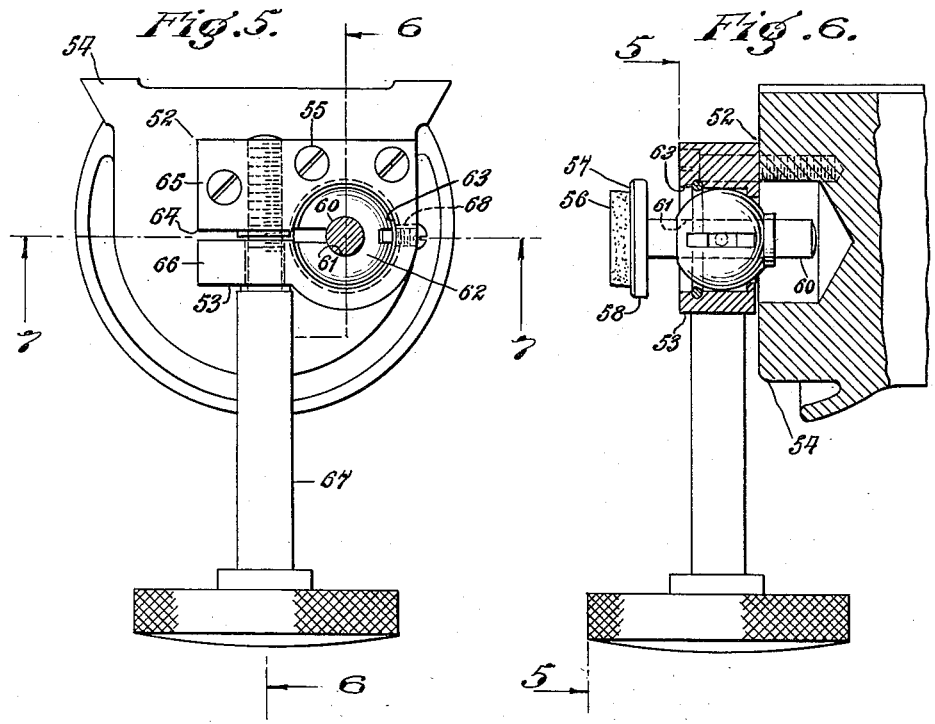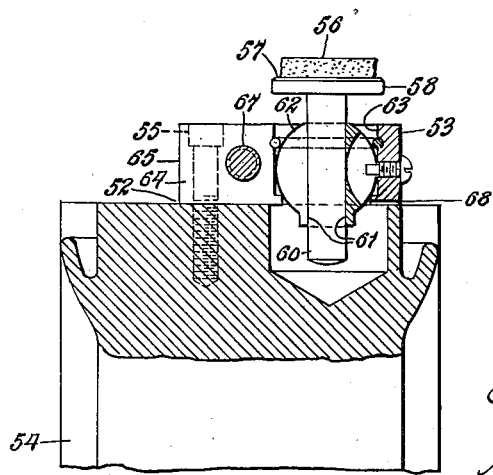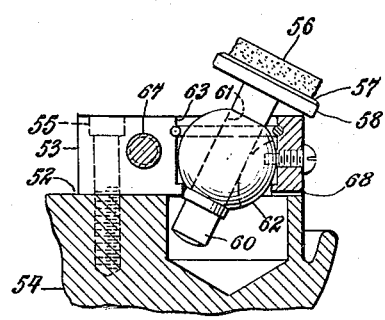

2,212,953

UNITED STATES PATENT OFFICE 2,212,953

OBJECT CLAMP FOR MICROTOMES, ETC.

Walter H. Popp and George S. MacDonald, Buffalo, N. Y., assignors to Spencer Lens Company, Buffalo, N. Y., a corporation of New York Application September 19, 1938, Serial No. 230,744

6 Claims. (Cl. 88—40)

This invention relates to an object clamp for enabling an object to be oriented in any desired position and then clamped in this position, and it particularly relates to an object clamp for holding a biological specimen embedded in a paraffin or celloidin block in proper position on a microtome, so as to enable a series of laminations to be cut off from said block by the microtome knife in the usual and well known manner.

The primary object of the invention is to effect this result in a new and improved manner, particularly as relates to the firmness with which the clamp is held in place after having been oriented to the desired position.

Numerous other subjects of the invention and practical solution thereof are disclosed in detail in the patent specification herein:

In the accompanying drawings:

Fig. 1 is a diminutive front elevation, partly in section, of a rotary microtome with one form of our invention applied thereto.

Fig. 2 is a top plan of the clamping head thereof, together with our invention attached thereto.

Figs. 3 and 4 are fragmentary vertical transverse sections through said clamping head on correspondingly numbered lines of Fig. 2.

Fig. 5 is a top plan view of a clamping head partly in section of a microtome provided with a modified form of our invention.

Fig. 6 is a fragmentary vertical longitudinal section thereof, taken on line 6—6, Fig. 5.

Fig. 7 is a fragmentary vertical transverse section thereof, taken on line 7—7, Fig. 5.

Fig. 8 is a fragmentary vertical section similar to Fig. 7, but showing certain of the parts thereof in tilted position.

Similar characters of reference indicate like parts throughout the several figures of the drawings.

Figures 1–4

In Fig. 1 is shown a fragmentary front elevation of a typical form of rotary microtome equipped with one form of our improved object clamp. In general, such a mocrotome is constituted as follows:

The microtome knife 10 is clamped by a pair of clamp screws 11 to a pair of swivel heads 12 and the latter adjusted relatively to the base 9 by means of a pair of adjusting swivel screws 13. This microtome knife 10 is adapted to cut a plurality of laminations of extreme thinness from the biological specimen embedded in a paraffin or celloidin block 14, which is secured in the usual and well known manner to the fibre block, 15. The latter is secured in the vise or holder 16 by the usual vise clamp screw 17 and is connected with the clamping head 18 in a manner hereinafter to be described in detail. This clamping head is provided with a longitudinal horizontal guideway 22. Power is applied to the microtome by the usual hand wheel 23 which is secured to the usual driving shaft and may be manually turned by the usual manual handle 25. Suitable mechanical apparatus, 24, well-known to those versed in the art, connects this driving shaft 24 with the vertically reciprocating carriage 21 and with the clamping head 18 which is horizontally slideable therein, so as to cause the specimen block 14 to move vertically downward to have a lamination cut off therefrom by the microtome knife 10 and then to move vertically upward and thereupon to advance forwardly whatever distance the instrument has been set for and to then repeat this cycle by again moving downwardly and having another lamination sliced off, etc.

The present invention concerns itself entirely with the means of securing the specimen block 14 in place relatively to the clamping head 18.

In the form of the invention shown on Figs. 1–4 the holder 16, to which is clamped the fibre block 15 which holds the specimen block 14, is provided with a cylindrical, horizontal, rearwardly-extending shank 26. This shank is received within the annular bore 27 of a spherical clamping collar 28. This collar is slit horizontally at 30 so that when its periphery is contracted it is clamped to aforesaid shank 26 of the holder 16. This split 30 in this spherical clamping collar 28 is disposed horizontally and parallel to the axis of the shank 26 and is diametrically opposite a horizontal longitudinal slot 31 which receives the smooth inner end 32 of an aligning screw 33. One purpose of this slot 31 is to so weaken the metal in the sperical clamping collar 28 at a point opposite its slit 30 that said clamping collar may be very firmly clamped to the shank 26 of the holder 16 with a minimum of effort.

Said spherical clamping collar 28 is received within a cylindrical recess 34 formed in the outer end of the clamping head 18, and the aligning screw 33, which is threaded into or otherwise secured to the clamping head 18, enables said clamping collar 28 to be rotated to a limited extent in any desired location and yet always maintaining the slit 30 of said clamping collar 28 parallel to the axis of the shank 26 of the holder 16. When said clamping collar 28 rotates in a horizontal plane the inner end 32 of the aligning screw 33 slides along the slot 31. When, on the other hand, said clamping collar 28 rotates in a vertical plane, this rotation is unaffected by said aligning screw 33 because the latter is so disposed that its axis intersects the geometrical center of the spherical clamping collar 28, as best seen in Fig. 3.

Formed integrally with the clamping collar 18 adjacent its recess 34 is a pair of clamping ears 35 and 36 which are separated by a split 37 and are adapted to be moved toward each other by a clamping screw 38. The latter is provided with a downwardly facing shoulder 40 against which bears a thrust washer 41 which engages the upper face of the upper ear 35, while the lower end of said clamping screw is provided with threads 42 which engage suitable female threads in the lower ear 36. The upper end of this clamp screw 38 is preferably provided with a large circular head 43 so as to be easily turned manually.

Rearward displacement of the spherical clamping collar 28 relative to the clamping head 18 is prevented by an annular shoulder 44 which is formed in the rear end of the recess 34, while forward displacement of said spherical clamping collar 28 is prevented by a resilient limiting ring 45 which engages with a suitable annular limiting groove 46 formed in the front part of the recess 34 of the clamping head 18. The swiveling movement of the spherical clamping collar 28 is limited in extent by an annular limiting skirt 47 which is integrally formed at the rear end of said spherical clamping collar 28 and is adapted to engage with the rear recess 48 of the clamping head (see Figs. 1 and 8). It should be noted in this regard that the swiveling action of this spherical clamping collar 28 is limited irrespective of whether or not the shank 26 of the holder 16 is in position in the bore 27 of the spherical clamping collar.

Formed in the clamping head 18 just rearwardly of its annular recess 34 is a split 50. This split is disposed vertically and transversely of the axis of the clamping head 18 and extends approximately half way through said clamping head (see Fig. 4) on that side thereof which is provided with the ears 35 and 36. By reason of this split 50 the ears 35 and 36 of said clamping head 18 are enabled to be drawn together and the front end of the clamping head 18 to be tightly wrapped around the periphery of the spherical clamping collar 28 with a minimum amount of manual effort.

In using this invention the vise screw 17 is first loosened and the fibre block 15 bearing its specimen block 14 is clamped in place in the holder 16. The clamping screw 43 is then loosened and the holder 16 swiveled about (together with the spherical clamping collar 28) to whatever position is most suitable for effective presentation of the specimen block 14 to the microtome knife 10. The clamping screw 43 is then tightened and the microtome ready for operation.

In machining the clamping head 18 it is desirable to have a relatively wide milling cutter form its horizontal longitudinal split 37. The resulting wide split is, however, disadvantageous in that, if the clamping screw 43 is tightened when the shank 26 of the holder 16 is not in position, the spherical clamping collar 28 is liable to be squeezed to such an extent as to become permanently distorted. This is prevented by the employment of a safety spacing washer 51 which is interposed between the two ears 35 and 36 of said clamping head 18 and is held in position by embracing within its circular hole the shank of the clamping screw 17.

Figures 5–8

This construction shows a modification of the invention more particularly adapted to be used with a microtome of the sliding type. In this form of microtome the specimen block 56 is slowly fed upwardly and the microtome knife (not shown) caused to move back and forth on a fixed horizontal plane. In Fig. 5, which is a top plan partly in section of this form of the invention, the clamping head 52 consists of two separate parts 53 and 54 which are suitably held together by three counter-sunk machine screws 55. In this construction is shown the specimen block 56 suitably secured directly to the face 57 of a disc holder 58 in the usual and well-known manner. The shank 60 of said holder 58 is received within the bore 61 of a spherical clamping collar 62 and the latter in turn received with a recess 63 formed in the outer member 53 of the clamping head 52. Said outer member 53 is slit at 64 in a manner similar to that of the slit 37 in the construction of Figs. 1 to 4 and the ears 65 and 66 are similarly drawn together by clamping screw 67. In the present case, however, the one ear 65 is rigidly secured to the outer clamping head member 53 by the countersunk machine screws 55, only the ear 66 being free to move in a direction perpendicular of the axis of the recess 63. This is effected by having a portion of the rear face of said outer member 53 milled away at 68 so that only the rear portion of said outer member 53 which is adjacent the machine screws 55 is in direct, rigid contact with the rear member 54 of the clamping head. This enables the front portion of said outer member 53 of the clamping head to move freely without unnecessary frictional resistance against the rear member 54 of said clamping head. This milled away portion 68 is therefore analogous to the transverse slit 50 of Figs. 1 to 4.

We claim:

1. An object clamp for microtomes comprising: a holder; means for securing an object to said holder; a clamping head having a recess which is provided at its outer end with a retaining groove and at its inner end with a shoulder; a resilient retaining ring disposed in said groove; a spherical clamping collar connected with said holder and arranged in said recess intermediate of said shoulder and said retaining ring; and means for clamping the clamping head upon the collar.

2. An object clamp for microtomes comprising: a holder having a shank; means for securing an object to said holder; a split spherical clamping collar having a bore which receives the shank of the holder and having an aligning slot arranged opposite said split; a clamping head having a recess which receives said collar; an aligning member connected with said head and engaging said slot; and means for clamping said head upon said collar and simultaneously clamping said collar upon the shank of the holder.

3. An object clamp for microtomes comprising: a holder having a shank; means for securing an object to said holder; a longitudinally split spherical clamping collar having a bore which receives the shank of the holder and having a longitudinal aligning slot arranged opposite said split; a clamping head having a recess which receives said collar and is provided with a longitudinal split adjacent said recess; an aligning member connected with said head and engaging said slot; and means for clamping said head upon said collar and simultaneously clamping said collar upon the shank of the holder.

4. An object clamp for microtomes comprising: a holder having a shank; means for securing an object to said holder; a longitudinally split spherical clamping collar having a bore which receives the shank of the holder and having a longitudinal aligning slot arranged opposite said split; a clamping head having a recess which receives said collar and is provided with a longitudinal split adjacent said recess; an aligning screw connected with said head on an axis which intersects the center of the spherical clamping collar and projecting into the slot of said collar; and means for clamping said clamping head upon said collar and simultaneously clamping said collar upon the shank of the holder.

5. An object clamp for microtomes and the like comprising: a holder having a shank; means for securing an object to said holder; a clamping collar having a bore which receives said shank of said holder; a clamping head having a recess which receives said collar and having a longitudinal split adjacent said recess; a pair of ears connected with said clamping head adjacent said split; a clamping screw adapted to force said ears toward each other; and a safety spacer arranged between said ears.

6. An object clamp for microtomes comprising: a holder; means for securing an object to said holder; a spherical clamping collar having a bore which receives said holder and being split in a direction parallel to the axis of said bore; a clamping head connected with the microtome and having a recess which receives said clamping collar and having a pair of ears symmetrically disposed with respect to the split in said clamping collar; means for clamping said ears together; and means for preventing rotation of said clamping collar relatively to said clamping head.

GEORGE S. MACDONALD.
WALTER H. POPP.